(12) United States Patent
Okutsu et al.

(10) Patent No.: US 7,570,385 B2
(45) Date of Patent: Aug. 4, 2009

(54) IMAGE OUTPUT CONTROL APPARATUS, IMAGE OUTPUT CONTROL METHOD, IMAGE OUTPUT CONTROL PROGRAM AND PRINTER

(75) Inventors: Masaru Okutsu, Ebina (JP); Toshiyuki Yano, Ebina (JP); Yoshiharu Hibi, Ebina (JP); Pauvi Sulistio, Ebina (JP)

(73) Assignee: Fuji Xerox Co., Ltd., Tokyo (JP)

( * ) Notice: Subject to any disclaimer, the term of this patent is extended or adjusted under 35 U.S.C. 154(b) by 893 days.

(21) Appl. No.: 10/986,934

(22) Filed: Nov. 15, 2004

(65) Prior Publication Data

US 2005/0238224 A1 Oct. 27, 2005

(30) Foreign Application Priority Data

Apr. 26, 2004 (JP) ............................. 2004-130409

(51) Int. Cl.
*G06F 15/00* (2006.01)
*G06K 1/00* (2006.01)

(52) U.S. Cl. ...................... 358/1.18; 382/154; 358/1.1; 358/1.13; 358/1.14; 358/1.16; 348/58

(58) Field of Classification Search ................ 358/1.18; 382/154; 353/20, 31; 351/206; 375/240.01; 600/111; 348/58
See application file for complete search history.

(56) References Cited

U.S. PATENT DOCUMENTS

| | | | |
|---|---|---|---|
| 5,860,912 A * | 1/1999 | Chiba ......................... | 600/111 |
| 6,584,219 B1 * | 6/2003 | Yamashita et al. .......... | 382/154 |
| 6,614,927 B1 * | 9/2003 | Tabata ........................ | 382/154 |
| 6,683,699 B1 * | 1/2004 | Ashizaki et al. ............ | 358/1.18 |
| 6,757,422 B1 * | 6/2004 | Suzuki et al. ............... | 382/154 |
| 6,893,128 B2 * | 5/2005 | Mizukusa et al. .......... | 351/206 |
| 6,899,429 B2 * | 5/2005 | Hamada et al. ............. | 353/20 |
| 6,956,964 B2 * | 10/2005 | Lee et al. .................... | 382/154 |
| 6,996,267 B2 * | 2/2006 | Tabata ........................ | 382/154 |
| 7,164,786 B2 * | 1/2007 | Katayama et al. .......... | 382/154 |
| 7,254,265 B2 * | 8/2007 | Naske et al. ................ | 382/154 |
| 7,372,987 B2 * | 5/2008 | Tokuhashi et al. ......... | 382/154 |
| 2003/0012425 A1 * | 1/2003 | Suzuki et al. ............... | 382/154 |
| 2004/0145705 A1 * | 7/2004 | Hamada et al. ............. | 353/31 |
| 2005/0117637 A1 * | 6/2005 | Routhier et al. ........ | 375/240.01 |
| 2008/0030574 A1 * | 2/2008 | Sun ............................. | 348/58 |

FOREIGN PATENT DOCUMENTS

JP A-2002-287275 10/2002

\* cited by examiner

*Primary Examiner*—Edward L Coles
*Assistant Examiner*—Satwant K Singh
(74) *Attorney, Agent, or Firm*—Oliff & Berridge, PLC

(57) ABSTRACT

An image output control apparatus is capable of outputting normal images and stereo images from an output unit to a display device or a printer so that the normal images and the stereo images may be distinguishable. The image output control apparatus includes an image type determining unit that determines whether an image to be output is a stereo image or a normal image, the stereo image being composed of a pair of a left-eye image and a right-eye image, and an output form control unit that controls an image output form to distinguish a first image output form from a second image output form, the first image output form being used for outputting the stereo image, and the second image output form being used for outputting the normal image, according to the determination of the image type determining unit.

13 Claims, 14 Drawing Sheets

| No. | File Name | 3D |
|---|---|---|
| 0 | DSC001.jpg | 0 |
| 1 | DSC002.jpg | 1 |
| 2 | DSC003.jpg | 1 |
| 3 | DSC004.jpg | 0 |

FIG. 13
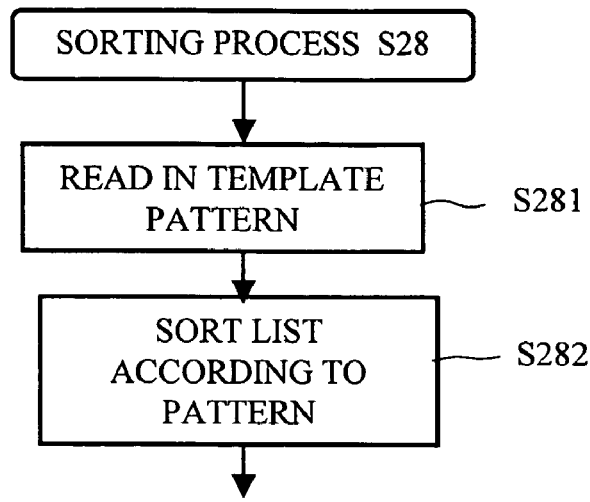
FIG. 14A    FIG. 14B
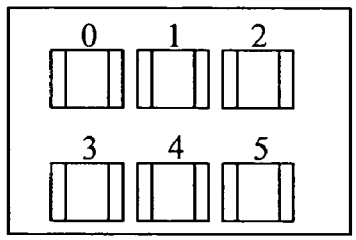    
| NO | FILE NAME | 3DFLAG |
|---|---|---|
| 0 | DSC001.jpg | 0 |
| 1 | DSC004.jpg | 0 |
| 2 | DSC005.jpg | 0 |
| 3 | DSC002.jpg | 1 |
| 4 | DSC003.jpg | 1 |
FIG. 15A    FIG. 15B
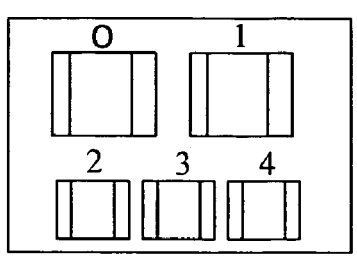    
| NO | FILE NAME | 3DFLAG |
|---|---|---|
| 0 | DSC002.jpg | 1 |
| 1 | DSC003.jpg | 1 |
| 2 | DSC001.jpg | 0 |
| 3 | DSC004.jpg | 0 |
| 4 | DSC005.jpg | 0 |

ORIGINAL

100

SELECT TO PRINT

| STRENGTH LEVEL | |
|---|---|
| LEVEL 0 | X |
| LEVEL 1 | XX |
| LEVEL 2 | XXX |
| LEVEL 3 | XXXX |

| STRENGTH LEVEL | |
|---|---|
| LEVEL 0 | WHITE |
| LEVEL 1 | BLUE |
| LEVEL 2 | YELLOW |
| LEVEL 3 | RED |

IMAGE OUTPUT CONTROL APPARATUS, IMAGE OUTPUT CONTROL METHOD, IMAGE OUTPUT CONTROL PROGRAM AND PRINTER

BACKGROUND OF THE INVENTION

1. Field of the Invention

This invention relates to an image output control apparatus, an image output control method, an image output control program, and a printer to output both a stereo image and an ordinary image to a printer, a display device, or the like.

2. Description of the Related Art

Stereo image, namely, three-dimensional imaging (hereinafter simply referred to as 3DI) has been well known. Specifically, when viewing two images, parallax between the two eyes makes it possible to view the two images in three dimensions. It is known to provide an apparatus that prints out such stereo images. The above-mentioned apparatus makes a merged or composite stereo image with left-eye and right-eye images at optimal intervals so as to print out the merged or composite image as a stereo image. The left-eye and right-eye images are composed of separate image files or separate frames.

In recent years, with the advancements of multifunctional equipment for taking images such as a digital camera, another type of equipment for taking images has been proposed. This equipment is capable of storing a pair of stereo images that utilizes the parallax between the two eyes. The equipment such as a digital camera is not always used for storing the stereo images; however, the equipment can selectively be used for both normal images, namely, two-dimensional flat images (hereinafter simply referred to as 2DI) and the stereo images, namely, three-dimensional spatial images, as required. Therefore, both the normal images and stereo images are stored in a built-in recording medium such as a memory card or the like.

FIG. 1 shows a conventional print example. In the case where various images that are stored in the recording medium are output as image files, that is, a list of the image files such as index is displayed or printed out; the multiple images are output in a predetermined order of the image files. Referring to FIG. 1, the images 2DI (1), 2DI (2), 3DI (1), and 3DI (2) are output to an output area 100, in the order of DSC001, DSC002, DSC003, and DSC004. Here, the images 2DI (1) and 2DI (2) are enlarged or reduced normal images, depending on the size of the output area 100 such as a printout paper, or a display screen. The images 3DI (1) and 3DI (2) are the stereo images that respectively contain a pair of the left-eye and right-eye image data.

However, in the case where both the normal image 2DI and the stereo image 3DI are output, it is hard for a user to distinguish the normal image 2DI from the stereo image 3DI at aglance. Particularly, in the case where the images are complex or intricate, there is a possibility that the normal image 2DI is mistaken for the stereo image 3DI. Also, there is another possibility that the stereo image 3DI is mistaken for the normal image 2DI.

SUMMARY OF THE INVENTION

The present invention has been made in view of the above circumstances and provides an image output control apparatus, an image output control method, an image output control program, and a printer so that the normal image and the stereo image can be distinguishable readily.

According to one aspect of the present invention, there is provided an image output control apparatus for outputting images from an output unit including an image type determining unit that determines whether an image to be output is a stereo image or a normal image, the stereo image being composed of a pair of a left-eye image and a right-eye image, and an output form control unit that controls an image output form to distinguish a first image output form from a second image output form, the first image output form being used for outputting the image determined to be the stereo image, and the second image output form being used for outputting the image determined to be the normal image.

According to another aspect of the present invention, there is provided an image output control method for outputting images from an output unit including determining an image type that determines whether an image is a stereo image or a normal image, the stereo image being composed of a pair of a left-eye image and a right-eye image, and distinguishing a first image output form from a second image output form, the first image output form being used for outputting the image that the image type determining unit has determined to be the stereo image, and the second image output form being used for outputting the image that the image type determining unit has determined to be the normal image.

According to still another aspect of the present invention, there is provided a storage medium readable by a computer to execute a process of outputting images from an output unit on a computer, the storage medium including the steps of determining whether a type of an image is a stereo image or a normal image, the stereo image being composed of a pair of a left-eye image and a right-eye image, and controlling an image output form to distinguish a first image output form from a second image output form, the first image output form being used for outputting the image that has been determined as the stereo image, and the second image output form being used for outputting the image that has been determined as the normal image.

According to yet another aspect of the present invention, there is provided a printer including a printing unit, and an image output control apparatus that outputs images from the printing unit. The image output control apparatus for outputting images from an output unit including an image type determining unit that determines whether an image to be output is a stereo image or a normal image, the stereo image being composed of a pair of a left-eye image and a right-eye image, and an output form control unit that controls an image output form to distinguish a first image output form from a second image output form, the first image output form being used for outputting the image determined to be the stereo image, and the second image output form being used for outputting the image determined to be the normal image.

BRIEF DESCRIPTION OF THE DRAWINGS

Embodiments of the present invention will be described in detail based on the following drawings, wherein:

FIG. 13 shows a flowchart describing detailed procedure of sorting process;

FIGS. 14A and 14B show a sorting process of the index list;

FIGS. 15A and 15B show another sorting process of the index list;

DESCRIPTION OF THE EMBODIMENTS

A description will now be given, with reference to the accompanying drawings, of embodiments of the present invention.

Figure 2:
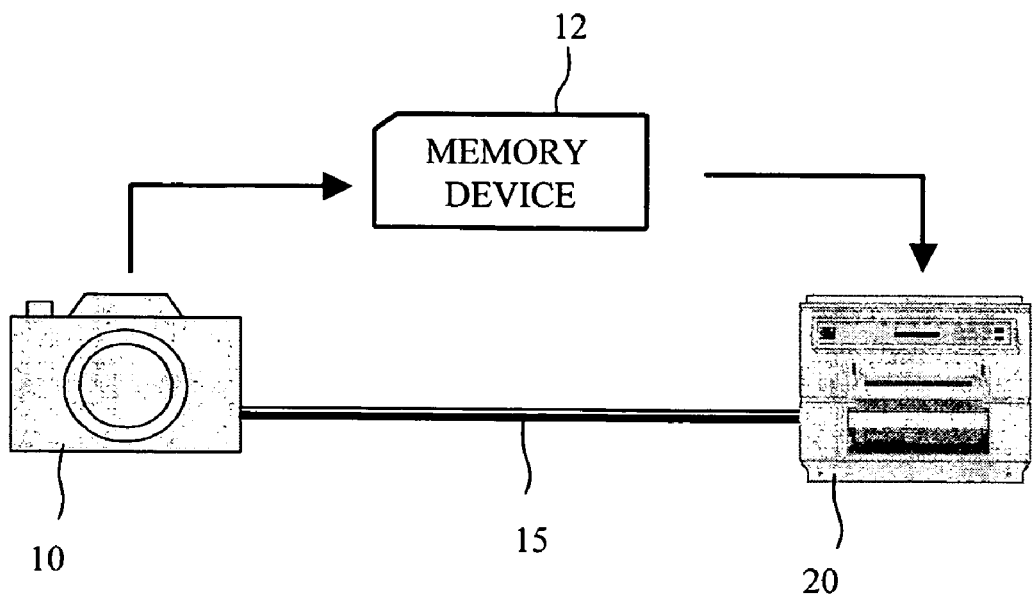
FIG. 2 shows a system of an image output control apparatus in accordance with a first embodiment of the present invention.

Referring to FIG. 2, a description will now be given of a first embodiment. FIG. 2 shows a system of an image output control apparatus in accordance with the first embodiment of the present invention.

As shown in FIG. 2, a digital camera 10 is connected to a printer 20 via a USB cable 15. The printer 20 is capable of reading image data from a memory device 12 via the USB cable 15. The memory device 12 is installed on the digital camera 10. The printer 20 is equipped with a slot for the memory device 12. So, the printer 20 is capable of reading the image data stored in the memory device 12, when the memory device 12 is removed from the digital camera 10 and is set onto the slot of the printer 20. The digital camera 10 operates in two modes, a normal mode and a stereo mode. The normal mode is used for capturing the two-dimensional normal image. The stereo mode is used for capturing the stereo image that contains a pair of left-eye and right-eye images. The normal images and stereo images that are taken in respective modes are saved (stored) in the memory device 12 in the order of taking. The stereo image is a stereoscopic image containing a pair of the left-eye and right-eye images (see the images 3DI (1) and the 3DI (2) in FIG. 1). The normal image and the stereo image are stored in image file formats including tag information, which is Exif tag information.

Figure 3:
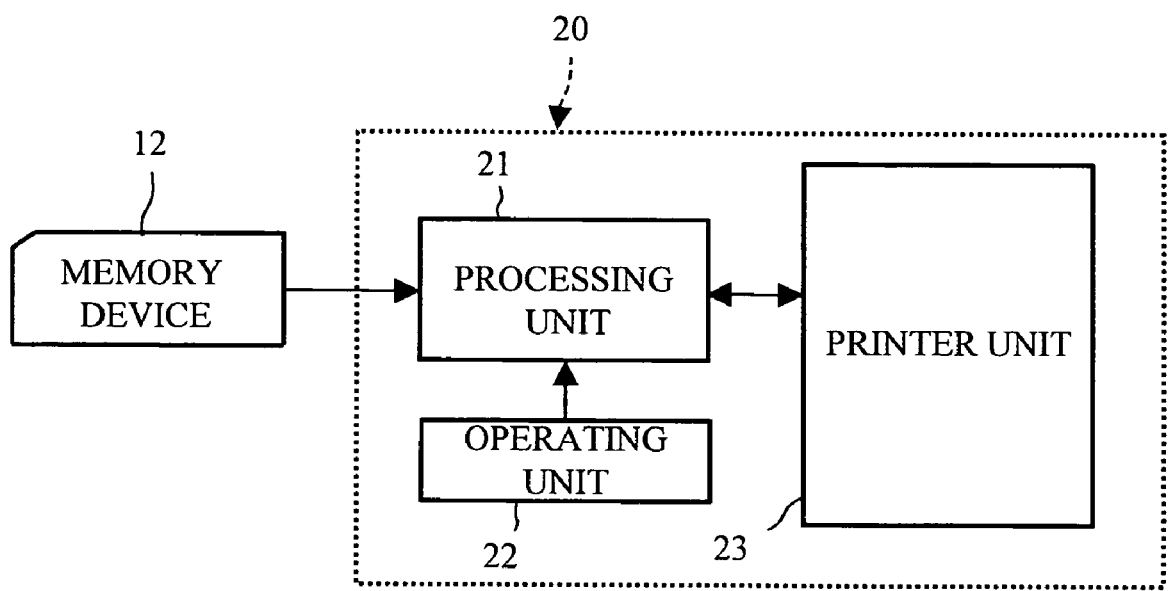
FIG. 3 shows a configuration of the printer 20.

FIG. 3 shows a configuration of the printer 20.

Referring to FIG. 3, the printer 20 includes a processing unit 21, an operating unit 22, and a printing unit 23. The processing unit 21 loads the normal image and the stereo image that are stored in the memory device 12 according to a preset program, and performs a given process to create print data showing the images to be printed out, then sends the print data to a printing unit 23. The printing unit 23 prints out the image on a paper under control of the processing unit 21, according to the print data.

Figures 4, 5:
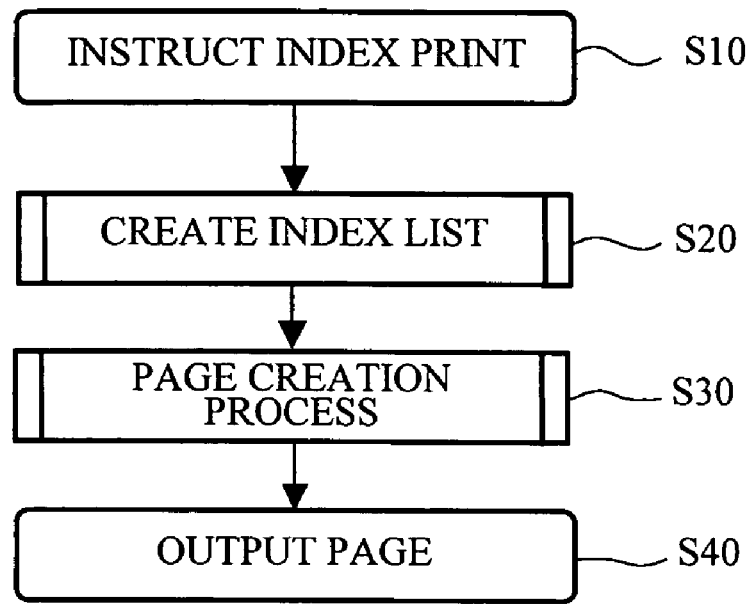
FIG. 4 is a flowchart describing procedure of index print.
FIG. 5 shows a configuration of index list.

In the case where a list of the normal images and the stereo images that are stored in the memory device 12 is printed out, namely, in the case of index print, the processing unit 21 implements the process following the procedure shown in FIG. 4.

Referring to FIG. 4, a control signal is input into the processing unit 21 from the operating unit 22. The control signal is generated based on an instruction of the index print (S10), and executes an index list creation process (S20) to create the list of the image files, which is referred to FIG. 5, to be printed out. When the above-mentioned index list is created, the processing unit 21 carries out a page creation process (S30) to create print data per page. The print data includes arranged index images that correspond to the image file shown in the above-mentioned index list. The index images include the normal images and the stereo images. Then, the processing unit 21 sends the print data per page to the printing unit 23 (S40).

Figure 6:
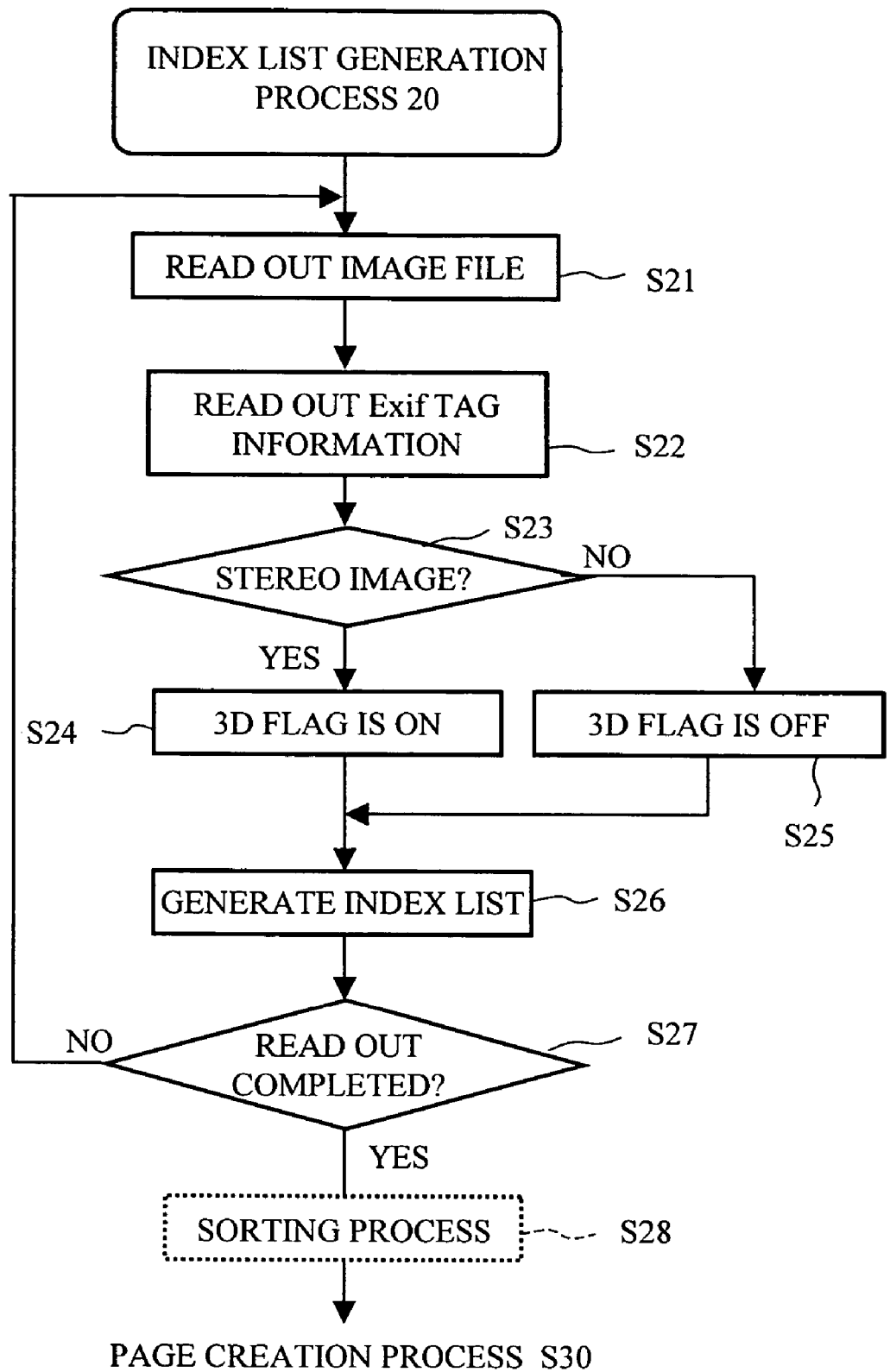
FIG. 6 is a flowchart describing detailed procedure of an index list creation process.

The index list creation process (S20) is performed by following the procedure shown in FIG. 6.

Referring to FIG. 6, the processing unit 21 loads an image file from the memory device 12, and reads the Exif tag information included in the image file (S22). The processing unit 21 determines whether or not an image in thus loaded image file is the stereo image, based on the Exif tag information (S23) If the image in thus loaded image file is determined to be the stereo image (YES in S23), the processing unit 21 sets a 3D flag to On, namely, "1" (S24), and adds an index to an index list. Here, the index includes pairs of the names of the image files and the 3D flags (S26). In contrast, if the image in thus loaded image file is determined to be the normal image (NO in S23), the processing unit 21 sets a 3D flag to Off, namely, "0" (S25), and adds the index including pairs of the names of the image files and the 3D flags to the index list (S26). Here, the processing unit 21 serves as an image type determining unit.

The processing unit 21 determines whether or not the entire image files are read out from the memory device 12 (S27). If the entire image files are not read out yet (NO in S27), the processing unit 21 loads the next image file from the memory device 12 (S21), and adds the index including pairs of the names of the image files and the 3D flags to the index list, as described above. The processing unit 21 repeats the above-mentioned process (if NO in S27) until the entire image files are read out from the memory device 12.

Figure 1:
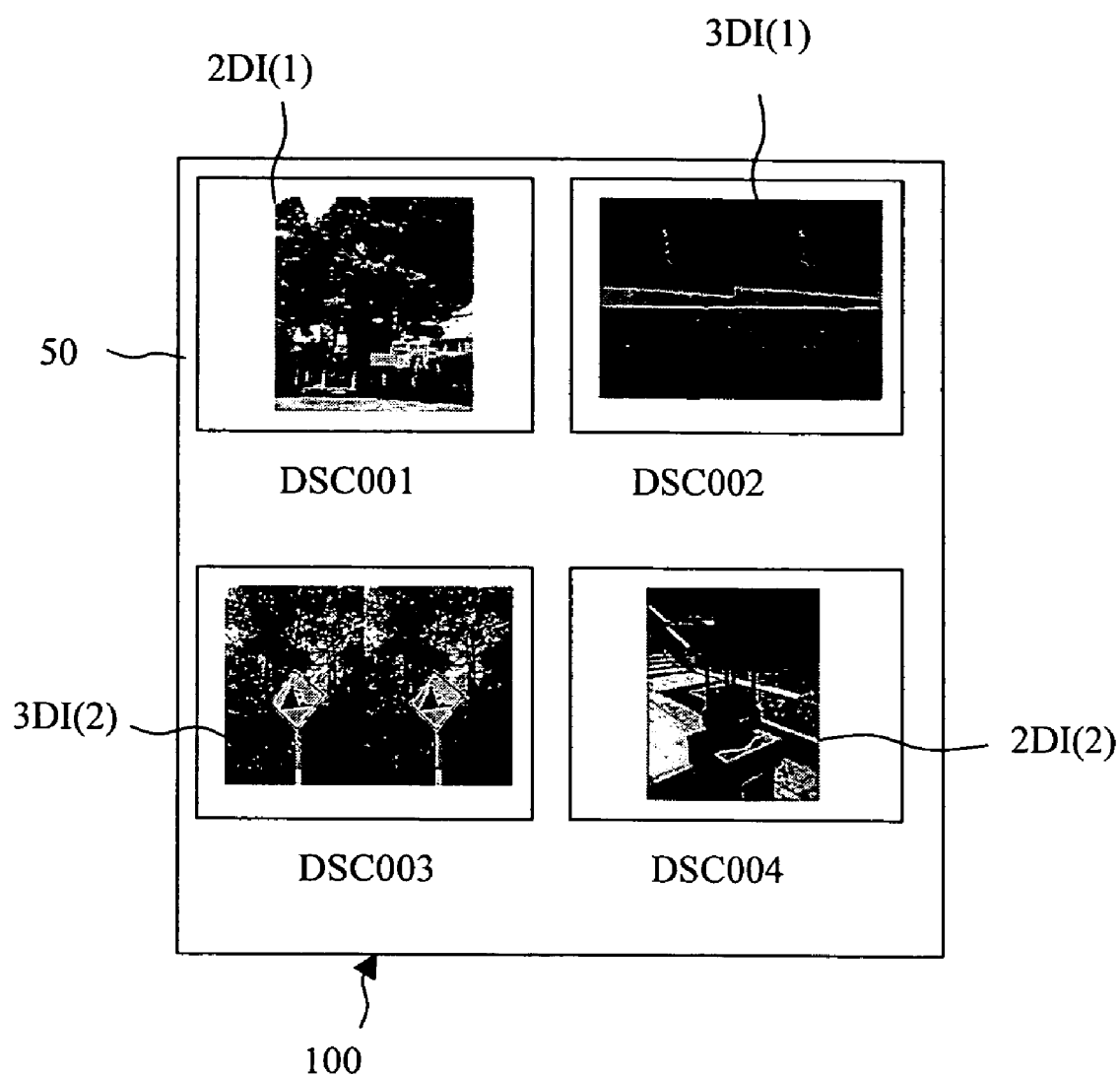
FIG. 1 shows an conventional print example.

When the entire image files are read out from the memory device 12 (YES in S27), the index list is completed. The index list includes the entire pairs of the name of the image files and the 3D flags. Here, as described above, the 3D flag represents the state whether the image is the normal image or the stereo image. In the case where there are four images stored in the memory device 12 including the normal images 2DI (1) and 2DI (2) and the stereo images 3DI (1) and 3DI (2) as shown in FIG. 1, and such four image files are loaded in the order of DSC001, DSC002, DSC003, and DSC004, the index list is created as shown in FIG. 5. In other words, the index list creation process is completed.

In the above-mentioned index list creation process, a sorting process that sorts each index in the index list may be performed (S28), as will be described later in detail.

Figure 7:
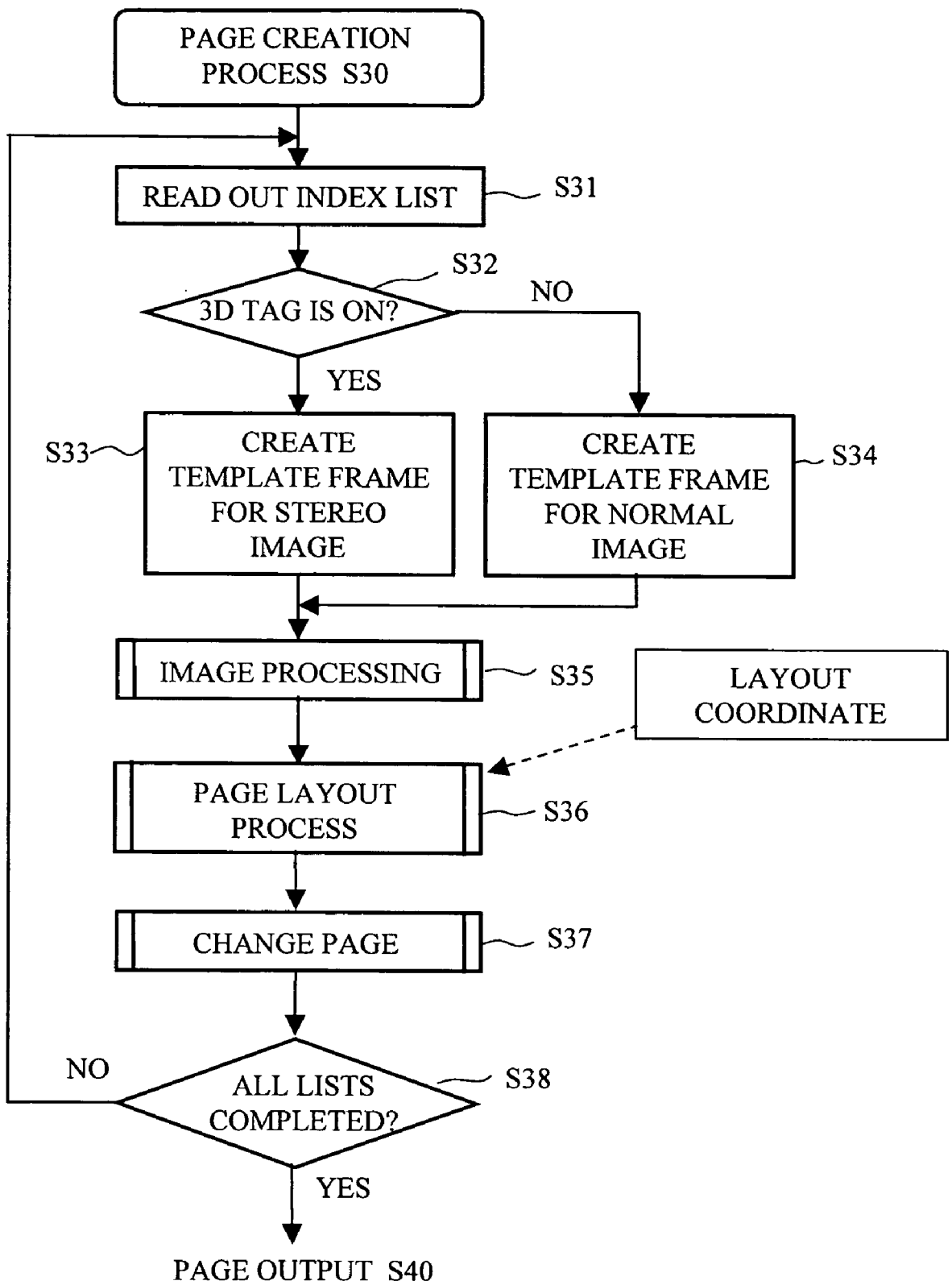
FIG. 7 is a flowchart describing detailed procedure of a page creation process.

After the index list creation process (S20), a page creation process (S30) is implemented following the procedure in FIG. 7.

Referring to FIG. 7, the processing unit 21 loads the index from the above-mentioned index list, and determines whether or not the 3D flag included in the index is On (S32). In other words, the image file that is listed in the index list is determined whether it is stereo or normal. If the 3D flag is determined On (YES in S32), the processing unit 21 creates an image frame template or the like for the stereo image, namely, an additional image (S33). In contrast, if the 3D flag is Off (No in S32), the processing unit 21 creates an image frame template or the like for the normal image (S34).

The processing unit 21 performs an image processing (S35). The processing unit 21 merges the image of the file and the above-mentioned template. Here, the image of the file is specified by the file name of the image. The image processing (S35) is implemented following the procedure shown in FIG. 8, for example.

Figure 8:
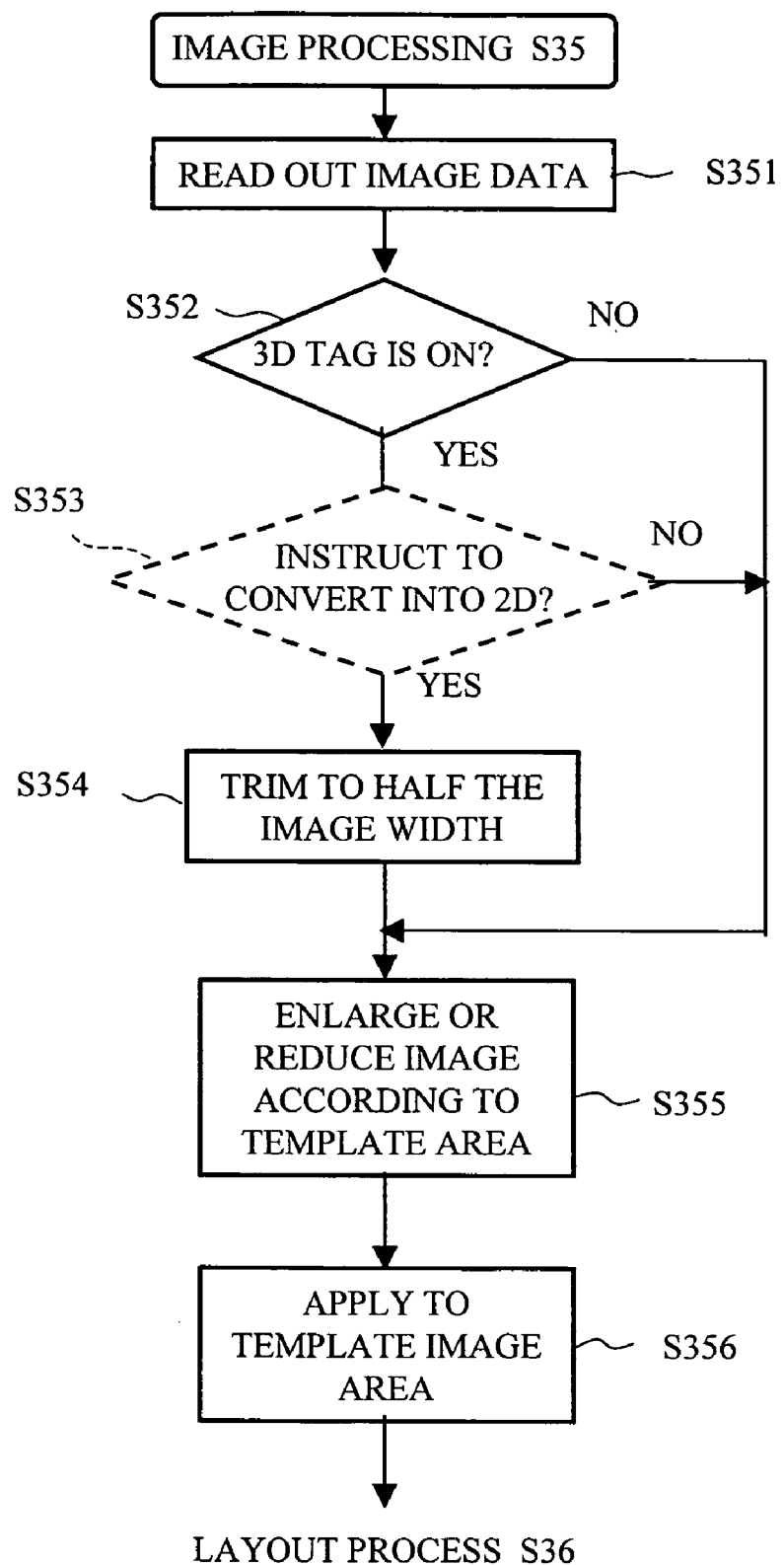
FIG. 8 is a flowchart describing detailed procedure of image processing.

Referring to FIG. 8, image data is loaded from the image file (S351), and is determined whether or not the 3D flag is On (S352). The 3D flag is paired with the image file. If the above-mentioned 3D flag is determined On (YES in S352), in other words, if the read out image (data) is a stereo image, the stereo image is further determined whether or not the stereo image has been instructed to be converted into the flat image, namely, the normal image (S353). This instruction may be made to convert the stereo image into the flat image by manipulating the operating unit 22, when the index print is instructed. If the stereo image is instructed to convert into the flat image, the processing unit 21 retains the information.

If the processing unit 21 determines that the stereo image has been instructed to convert into the flat image (YES in S353), the read out stereo image is trimmed off by half the width of the image and is separated into the let-eye image and the right-eye image (S354). Then, either the let-eye image or the right-eye image is selected for printout, and the selected image is enlarged or reduced according to a template area for the stereo image (S355). The image frame template or the like for the stereo image is created as described above (see S33 in FIG. 7). The enlarged or reduced image is applied to template area for the stereo image, namely, a merged image is made, and an index image showing the stereo image is created (S356). The processing unit 21 also serves as a separation determining unit and an image separation unit.

To choose the let-eye image or the right-eye image may be predetermined or may be designated by the operating unit 22.

If the read out image is determined to be the stereo image (YES in S352), and further, if the stereo image has not been instructed to be converted into the flat image (NO in S353), the read out stereo image is enlarged or reduced according to the template area for the stereo image without being converted (S355). Then, the enlarged or reduced image is applied to template area for the stereo image, and thus the index image showing the stereo images is created.

In contrast, if the read out image is not determined to be the stereo image (NO in S352), in other words, if the read out image is determined to be the normal image, the read out normal image is enlarged or reduced according to the template area for the normal image (S355). The template area for the normal image is shown in S34 of FIG. 7. Then, the enlarged or reduced image is applied to template area for the stereo image, namely, merged, and an index image showing the normal image is created (S356).

Referring back to FIG. 7, after the above-mentioned procedure for the image processing is completed, the processing unit 21 executes a page layout process (S36). In the page layout process, a location of thus created index image; namely, a layout coordinate value is designated on an image memory area for one page, according to a given rule. And the above-mentioned index image is located on the designated location in the image memory area for one page. Then, if the image memory area for one page is filled with the index images, the processing unit 21 changes the page (S37), and retains the image memory area for the next page. Here, the processing unit 21 serves as an output form control unit.

The processing unit 21 determines whether or not all the image files included in the index list have been processed (S38). If the processing unit 21 determines that all the image files have not been processed yet (NO in S38), the processing unit 21 loads the next index from the index list (S31), and executes the above-mentioned procedure (S32, one of S33 and S34, S35, S36, and S37), then locates the index images in the image memory area for one page. The index images may show either the stereo image or the normal image. The processing unit 21 repeats the above-mentioned process until the entire image files included in the index list are completed (S38).

After the page creation process is completed (S30), the processing unit 21 carries out a page output process (see S40 in FIG. 4). The processing unit 21 sequentially sends page data to the printing unit 23 as print data. The page data includes the index image showing the stereo image and the index image showing the normal image. The printing unit 23 carries out a printout process on a page-by-page basis, based on the received print data.

FIGS. 9 through 12 are print results of the print out process performed by the printing unit 23.

Figure 9:
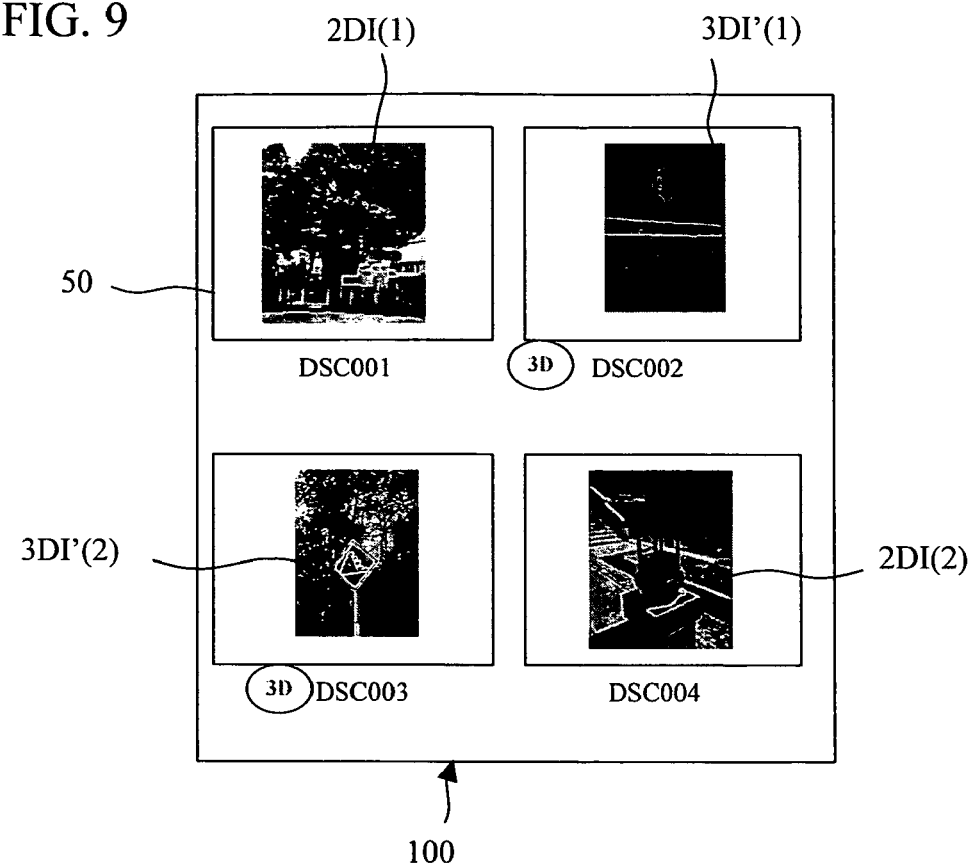
FIG. 9 shows a first example of the index print.

Referring to FIG. 9, a template for the stereo image includes a character string showing the stereo image, such as "3D" together with a frame image (see S33 in FIG. 7). The character string is an additional image. Any one of the left-eye and right-eye images that compose the stereo image is chosen as the image to be printed out (see S353 and S354 in FIG. 8). The index images showing the normal images and showing the stereo images are arranged inside a frame 50 on a print paper 100. The index images showing the normal images include the normal images 2DI (1) and 2DI (2). The index images showing the stereo images include any one of the left-eye and right-eye images, the images 3DI' (1) and 3DI' (2) and the character string "3D" that is located adjacent to the frame 50. According to the above-mentioned print results, the index images showing the stereo images include the character string "3D", which is a first image output form. The index images showing the normal images do not include such a character string "3D", which is a second image output form. Therefore, the user is able to readily distinguish the stereo images from the normal images included in the index images, judging from the absence or presence of the character string "3D" that represents the difference in a printout form.

Figure 10:
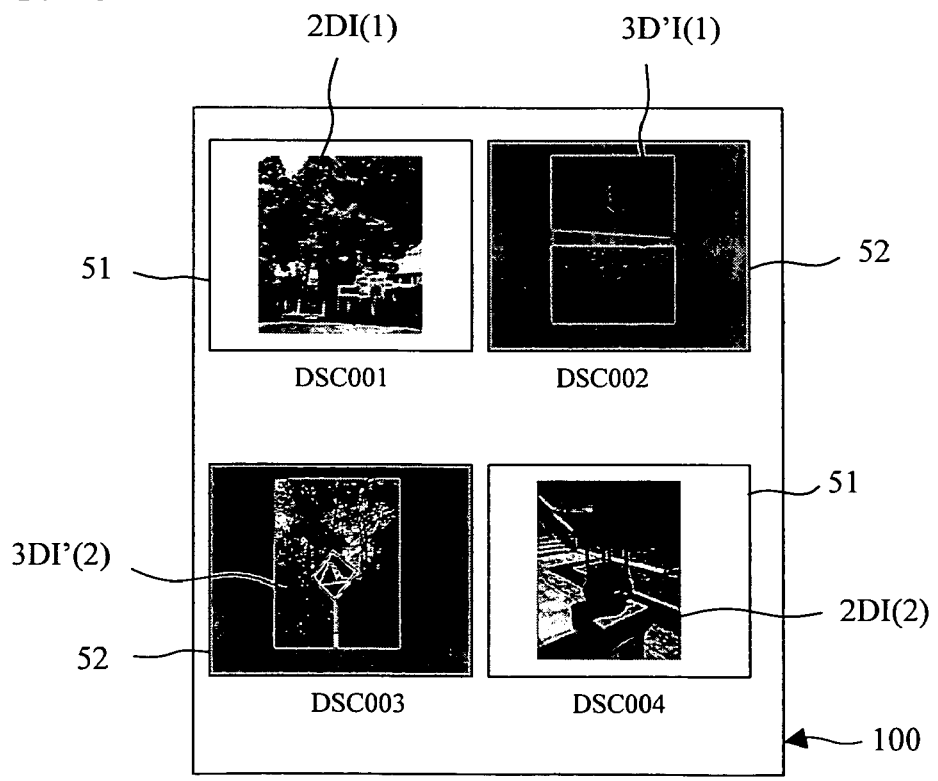
FIG. 10 shows a second example of the index print.

Referring to FIG. 10, the index images showing the normal images are arranged inside white frames, and the index images showing the stereo images are arranged inside non-white frames 52 on the printout paper 100. The images 2DI (1) and 2DI (2) are the index images showing the normal images. The images 3DI' (1) and 3DI' (2) having any one of the left-eye and right-eye images, are the index images showing the stereo images. Therefore, the user is able to readily distinguish the stereo images from the normal images included in the index images, judging from the difference in a printout form based on the difference of the frame color. There are two image output forms, the first image output form and the second image output form.

Figure 11:
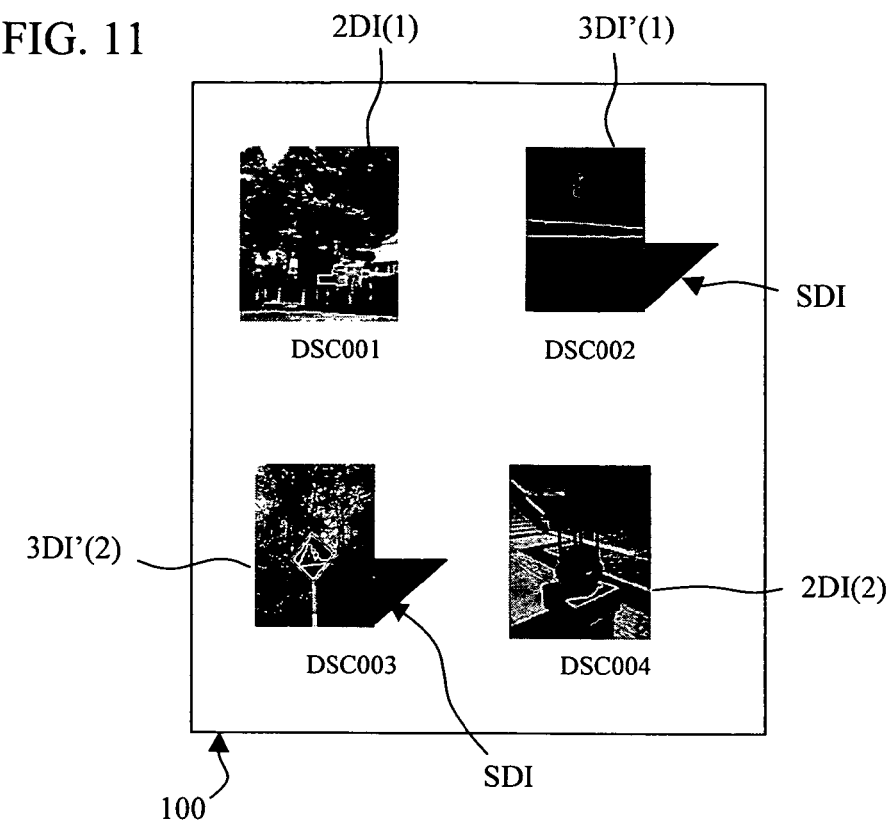
FIG. 11 shows a third example of the index print.

Referring to FIG. 11, FIG. 11 includes shadow images SDIs in the templates for the stereo images (see S33 in FIG. 7), and one of the left-eye and right-eye images that compose the stereo image is chosen to be printed out (see S353 and S354 in FIG. 8). That is, the index image showing the normal image is arranged inside a transparent frame, and the index image showing the stereo image, to which the shadow image is added, is arranged on the printout paper 100. The images 2DI (1) and 2DI (2) are the index images showing the normal images. The images 3DI' (1) and 3DI' (2) are the index images showing the stereo images with anyone of the left-eye and right-eye images. Therefore, the user is able to readily distinguish the stereo images from the normal images included in the index images, judging from the difference in a printout form based on the absence or presence of the shadow image SDI. There are two image output forms, the first image output form and the second image output form.

Figure 12:
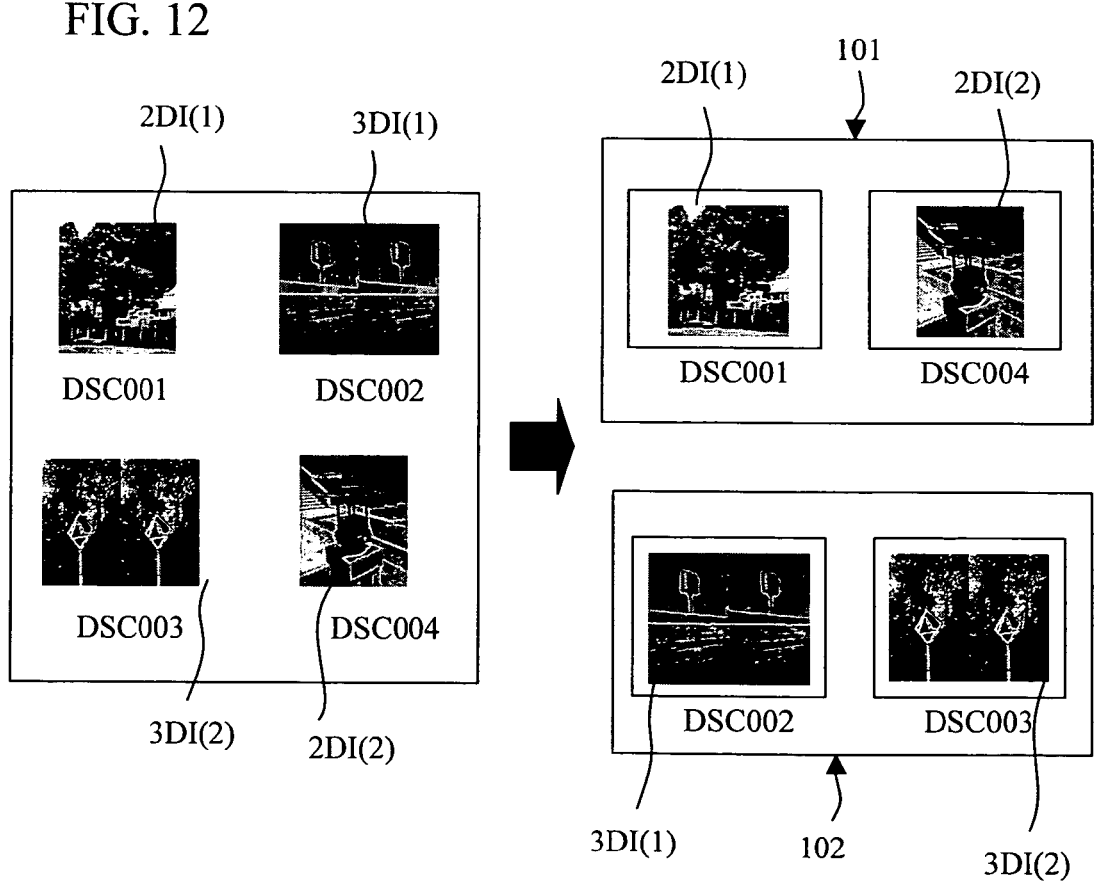
FIG. 12 shows a fourth example of the index print.

Referring to FIG. 12, the page on which the index images showing the stereo images are arranged (see S36 in FIG. 7) is different from that on which the index images showing the normal images are arranged (see S36 in FIG. 7). In other words, the index images showing the normal images such as 2DI (1) and 2DI (2) are arranged inside the frames on a printout paper 101. The index images showing the stereo images such as 3DI (1) and 3DI (2) are arranged inside the frames on another printout paper 102. Therefore, the user is able to readily distinguish the stereo images from the normal images included in the index images, judging from the difference in a printout form based on the difference in the printout paper. There are two image output forms; the first image output form and the second image output form.

A description will now be given of the sorting process (see S28 in FIG. 6).

Referring to FIG. 13, the sorting process (S28) is performed according to the procedure shown in FIG. 13. A predetermined pattern of the template is loaded (S281). Indexes in the index list shown in FIG. 5 are sorted (S282). For example, referring to FIG. 14A, in the case where the index images showing the normal images are arranged on the upper part of the paper, the index images showing the stereo images are arranged on the lower part of the paper, and the index images are arranged from top to bottom and from left to right, under a layout rule of the page layout process (see S36 in FIG. 7), the image files in the index list are sorted as shown in FIG. 14B, although the image files have been arranged in the order of being read out. Also, for example, referring to FIG. 15A, in the case where the index images showing the stereo images are arranged on the upper part of the paper, the index images showing the normal images are arranged on the lower part of the paper, and the index images are arranged from top to bottom and from left to right, under a layout rule of the page layout process (see S36 in FIG. 7), the image files in the index list are sorted as shown in FIG. 15B, although the image files have been arranged in the order of being read out.

Figure 16:
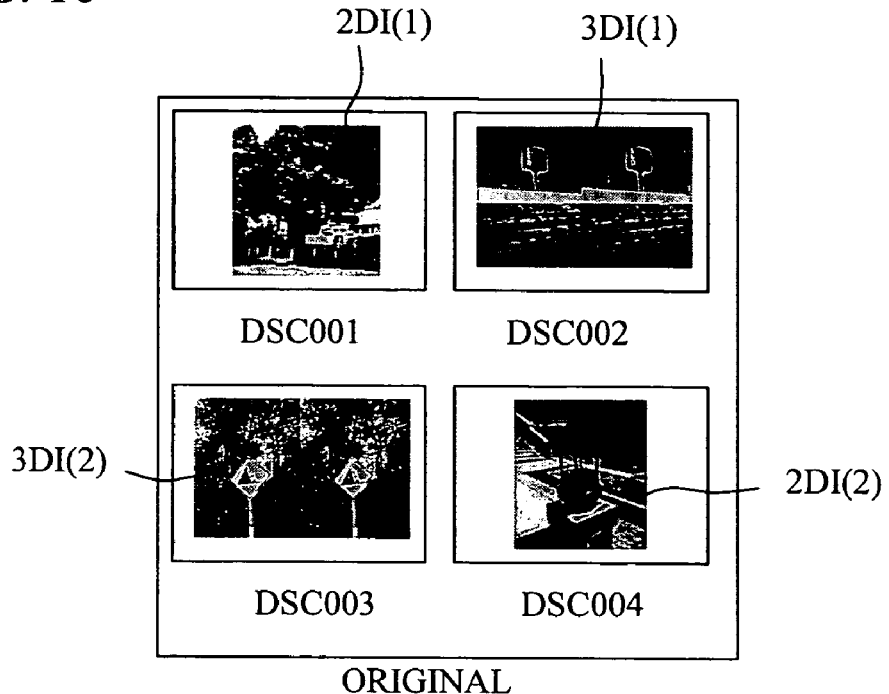
FIG. 16 shows a fifth example of the index print.

In the case where the sorting process is not carried out, the index images are arranged as shown in FIG. 16. FIGS. 17 through 20 show the index images after the sorting process.

Figure 17:
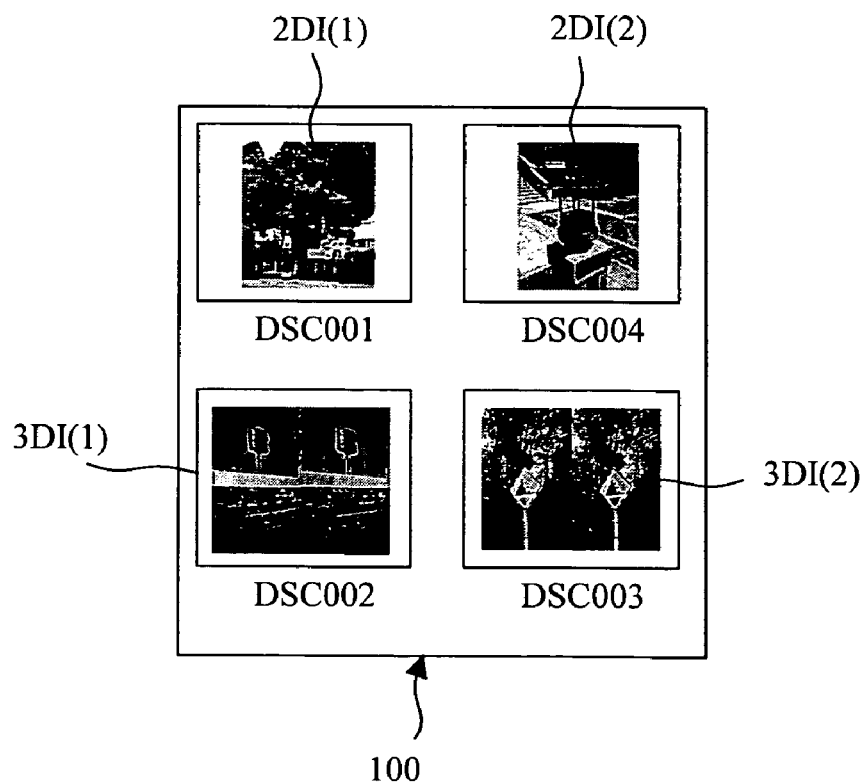
FIG. 17 shows a sixth example of the index print.

Referring to FIG. 17, the index images of the normal images that are included in the frames, namely, the images 2DI (1) and 2DI (2) are arranged on the upper part of the paper 100, and the index images showing the stereo images that are included in the frames, namely, the images 3DI (1) and 3DI (2) are arranged below the images 2DI (1) and 2DI (2). Therefore, the user is able to readily distinguish the index images showing the stereo images from those of the normal images, judging from the difference in the printout form. With this printout form, the index images showing the normal images are arranged on the upper part of the paper 100 and the index images showing the stereo images are arranged on the lower part of the paper 100.

Figure 18:
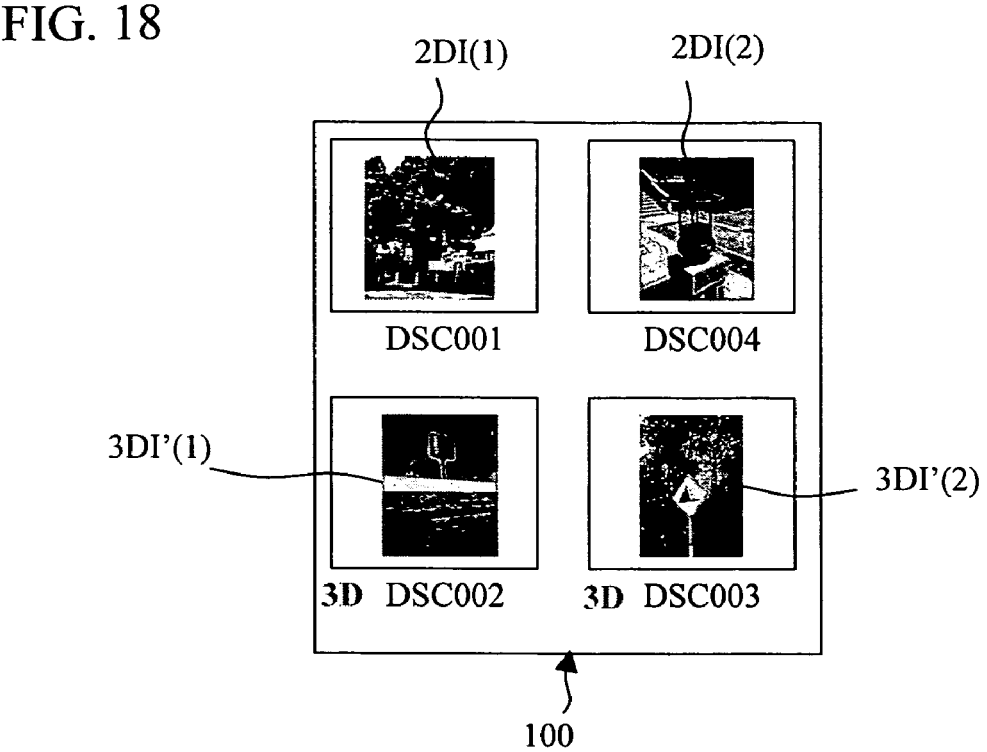
FIG. 18 shows a seventh example of the index print.

Referring to FIG. 18, the index images showing the stereo images are respectively composed of one of the left-eye and right-eye images, namely, the images 3DI' (1) and 3DI' (2) and the character string "3D". In the above-mentioned case, the user is able to readily distinguish the index images showing the stereo images from those showing the normal images that are arranged on the paper 100, judging from the difference in the arranged area and the absence or the presence of the character string "3D".

Figure 19:
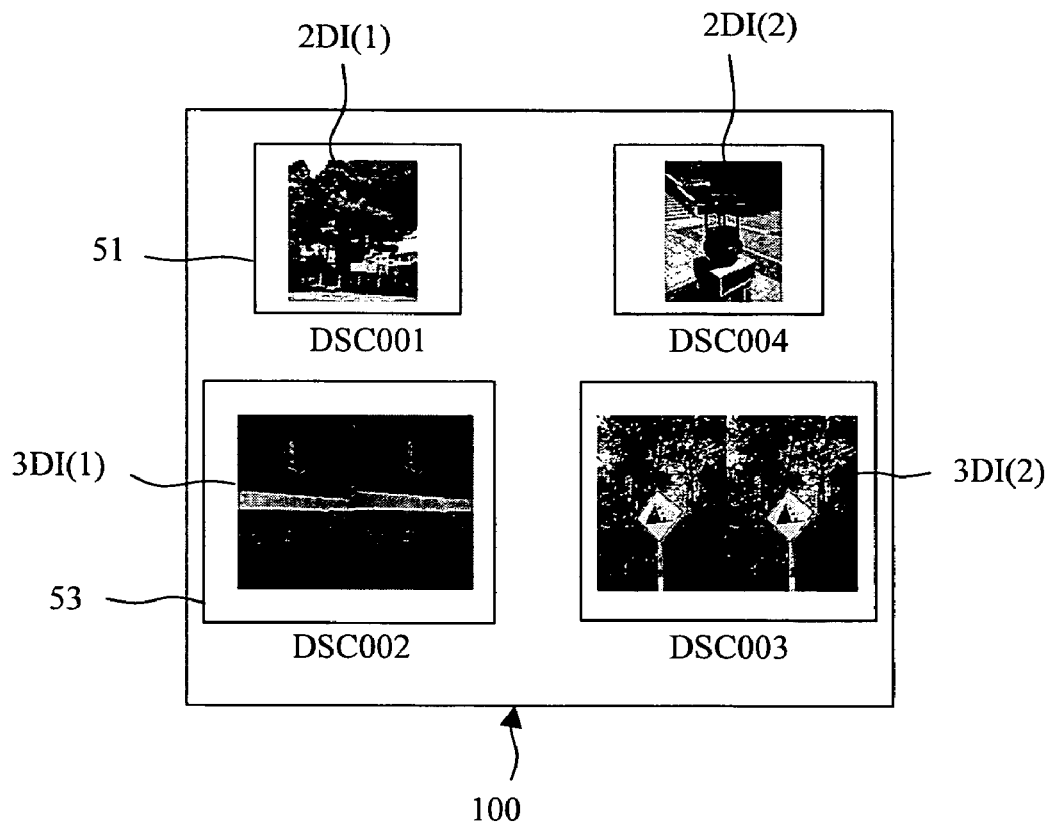
FIG. 19 shows an eighth example of the index print.

Referring to FIG. 19, template frame images for the stereo images 53 are larger than those for the normal images 51 (see S33 and S34 in FIG. 7). Thus, the index images showing the stereo images are larger than those showing the normal images. In the above-mentioned case, the user is able to readily distinguish the index images showing the stereo images from those showing the normal images that are arranged on the paper 100, judging from the difference in the arranged area and the difference in size between the index images. There are two image output forms; the first image output form and the second image output form.

Figure 20:
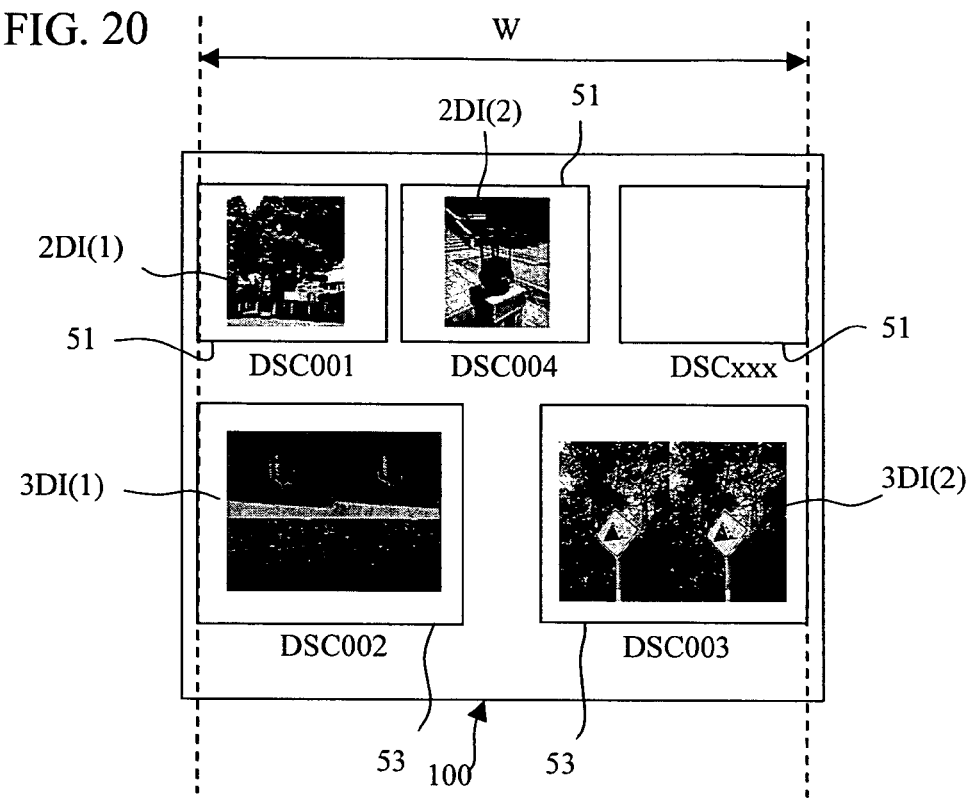
FIG. 20 shows a ninth example of the index print.

Referring to FIG. 20, an arrangement width W of the index images showing the normal images that are arranged on the upper part of the paper 100 is identical to another arrangement width W of the index images showing the stereo images that are arranged on the lower part of the paper 100. The above-mentioned output form can be realized by the layout rule that is employed in the page layout process, as shown in FIG. 7. In the above-mentioned case, even if the size of the index image showing the normal image, namely, the size of the template frame 51 is different from that of the index image showing the stereo image, namely, the size of the template frame 53, the arrangement width W is identical, and are equally justified on both sides. Thus, the index images showing the normal images and those showing the stereo images are arranged on the paper 100 so as to make a good show.

Figure 21:
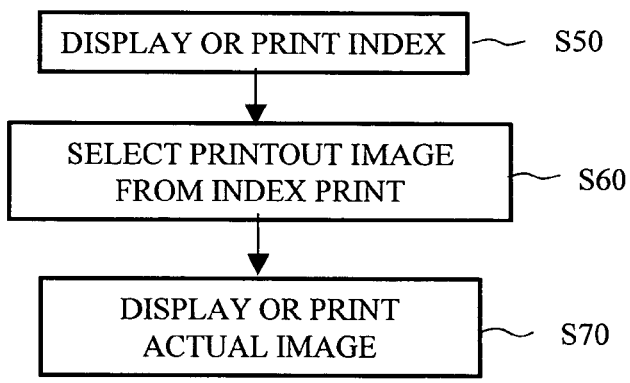
FIG. 21 is a flowchart describing printout procedure.

The printer 20 equipped with the processing unit 21 that executes the above-mentioned process performs printing operation, according to a procedure shown in FIG. 21.

Figure 22A:
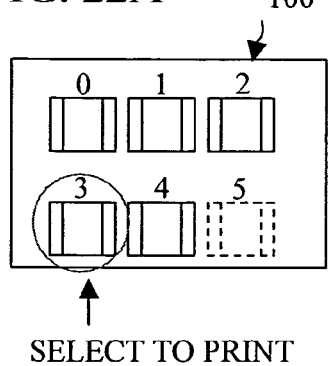
FIGS. 22A and 22B show the index print and the stereo image that is selected from the index print.
Figure 22B:
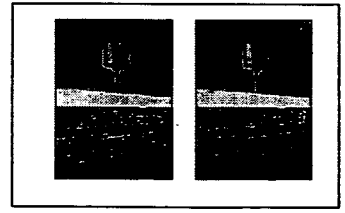

The printing unit 23 prints out the index images with the use of the print data that has been created according to the above-mentioned process (S50). The user, who has watched the paper on which the index images are printed, operates the operating unit 22 and inputs the file number of the printed index images such as DSC001 through DSC004 so as to print out the images, with reference to FIG. 22A. Then, the processing unit 21 sends the image data that is designated by the file number of the image to the printing unit 23. Thus, referring to FIG. 22B, the printing unit 23 prints out the image of the designated image file, which may be the normal image or the stereo image (S70).

In the case where the printed stereo image is viewed stereoscopically, the user's eyestrain depends on the intensity level in stereoscopy. It is possible to learn the intensity level of the stereo image to be printed out before printout, as will described below.

Figures 23, 24:
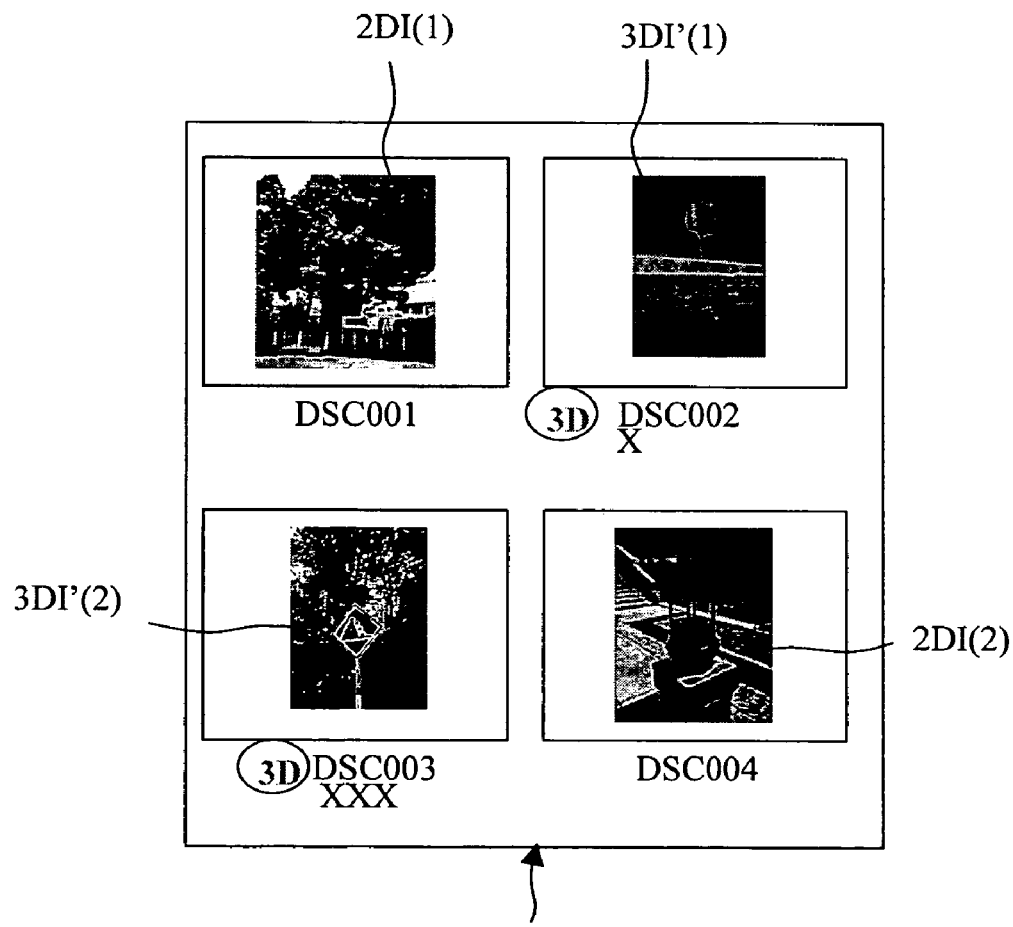
FIG. 23 shows a relationship between depth levels in stereoscopy and additional images (X mark)
FIG. 24 shows a tenth example of the index print.

In step S33 in FIG. 7, the template for the stereo image includes an additional image. The additional image corresponds to the intensity level of the stereo image that can be obtained from the Exif tag information. Referring to FIG. 23, for instance, the above-mentioned template includes at least one X-mark according to the intensity level in stereoscopy. In the above-mentioned case, the index images showing the stereo images such as the images 3DI' (1) and 3DI' (2) respectively include the number of the X-marks according to the intensity level in stereoscopy when the index images are printed out.

Figures 25, 26:
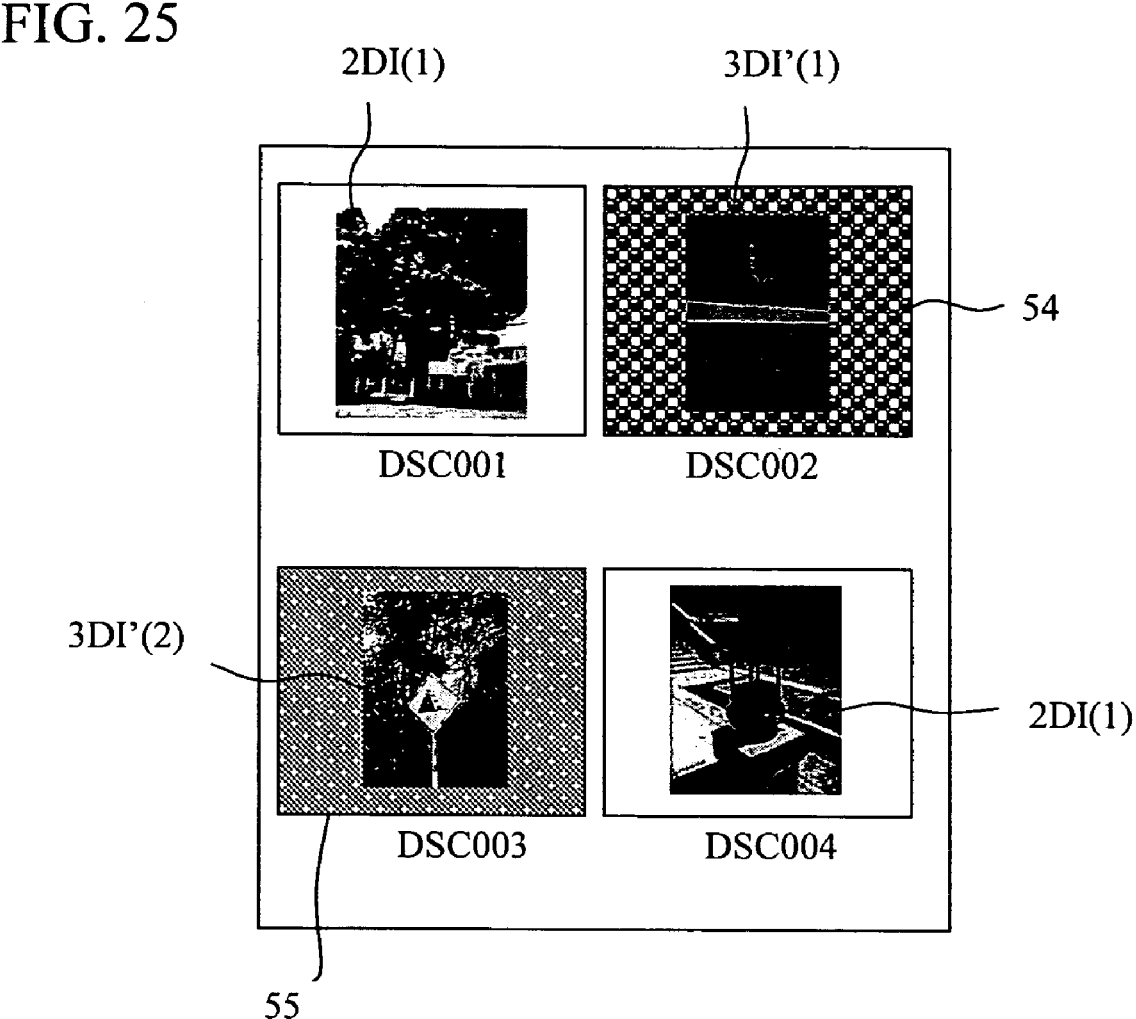
FIG. 25 shows a relationship between depth levels in stereoscopy and additional images (colors of frame images)
FIG. 26 shows a eleventh example of the index print.

In addition, the above-mentioned template includes the frame images having different colored frame according to the intensity level in stereoscopy. For instance, referring to FIG. 25, the frame images of "white", "blue", "yellow", and "red" are prepared for the templates for the stereo images. The colors correspond to the intensity level in stereoscopy. In the above-mentioned case, referring to FIG. 26, the index images showing the stereo images respectively include one of the left-eye and right-eye images, namely, the images 3DI' (1) and 3DI' (2) are included inside the colored frames that correspond to the intensity level in stereoscopy, when the index images are printed out.

The user is able to learn the intensity level in stereoscopy of the stereo image before printout, because the index image showing the stereo image includes the additional image showing the intensity level in stereoscopy, when the index image is printed out.

The processing unit 21 is included in the printer 20. However, the processing unit 21 may be included in the digital camera 10 or another computer terminal such as a personal computer.

In the case where the normal image and the stereo image are displayed on a display screen of a computer terminal or on a display screen of the digital camera 10, the above-mentioned procedures may be performed.

The image output control apparatus in accordance with the present invention has the useful effects when outputting on a display device or a printer so as to readily distinguish the normal image from the stereo image at a glance. Further, the image output control apparatus is useful in that both the stereo image and the normal image may be output on a display device or a printer.

In one aspect of the present invention, an image output control apparatus for outputting images from an output unit includes an image type determining unit that determines whether an image to be output is a stereo image or a normal image, the stereo image being composed of a pair of a left-eye image and a right-eye image, and an output form control unit that controls an image output form to distinguish a first image output form from a second image output form, the first image output form being used for outputting the image determined to be the stereo image, and the second image output form being used for outputting the image determined to be the normal image. With the above-mentioned configuration, multiple images are output in the first image output form, if the images are determined to be the stereo images, and multiple images are output in the second image output form, if the images are determined to be the normal images.

In the image output control apparatus in the above-mentioned aspect, the image type determining unit may determine whether the image to be output is the stereo image or the normal image, based on tag information included in a file of the image to be output. Thus, it is possible to distinguish the stereo images to be output from the normal images to be output with the tag information.

In the image output control apparatus in the above-mentioned aspect, the output form control unit may control the image output form to distinguish the first image output form from the second image output form, according to an absence or presence of an additional image to the image. The above-mentioned additional image may be a character, a drawing, or another type of image. With the above-mentioned configuration, any one of the stereo image and the normal image is output from the output unit, in the output form having the additional image. The output form may be the first output form or the second output form. Judging from the absence or the presence of the additional image, it is possible to distinguish the stereo image from the normal image that are output from the output unit. The additional image may be a character, a drawing, or another type of image.

In the image output control apparatus in the above-mentioned aspect, the output form control unit may control the image output form to distinguish the first image output form from the second image output form, by adding an additional image to the first image output form. Thus, the image that has been determined to be the stereo image is output from the output unit in the first output form. The image that has been determined to be the normal image is output from the output unit in the second output form.

In the image output control apparatus in the above-mentioned aspect, the first image output form may include information that indicates an intensity level of stereoscopic viewing of the stereo image. Thus, the image that has been determined to be the stereo image is output from the output unit in the first output form including the additional image of the intensity level in stereoscopy. It is possible to understand that the intensity level of stereoscopy of the image output from the output unit.

In the image output control apparatus in the above-mentioned aspect, the output form control unit may control the image output form to distinguish the first image output form from the second image output form, by adding different additional images to the stereo image and the normal image. With the above-mentioned configuration, the image that has been determined to be the stereo image is output from the output unit in the first output form with the additional image. The image that has been determined to be the normal image is output from the output unit in the second output form with another additional image.

In the image output control apparatus in the above-mentioned aspect, preferably, the different additional images include frame images. Thus, the image that has been determined to be the stereo image is output from the output unit in the first output form with the frame image. The image that has been determined to be the normal image is output from the output unit in the second output form with another frame image.

In the image output control apparatus in the above-mentioned aspect, the output form control unit may control the image output form to distinguish the first image output form from the second image output form, by adding different frame images to the stereo image and the normal image. Thus, the image that has been determined to be the stereo image is output from the output unit in the first output form with the colored frame image. The image that has been determined to be the normal image is output from the output unit in the second output form with another colored frame image.

In the image output control apparatus in the above-mentioned aspect, the output form control unit may distinguish the first image output form from the second image output form, based on a size of the images to be output. Thus, the image that has been determined to be the stereo image is output from the output unit in the first output form of a certain size. The image that has been determined to be the normal image is output from the output unit in the second output form of another size. It is possible to distinguish the stereo image from the normal image from the output size.

In the image output control apparatus in the above-mentioned aspect, the output form control unit may control the image output form to distinguish the first image output form from the second image output form, by enlarging the size of the stereo image to be larger than the normal image. Thus, the image that has been determined to be the stereo image is output from the output unit in the first output form of a certain size. The image that has been determined to be the normal image is output from the output unit in the second output form larger than the first form. It is possible to distinguish the stereo image from the normal image from the output size. Here, the stereo images are larger than the normal images.

In the image output control apparatus in the above-mentioned aspect, the output form control unit may control the image output form to distinguish the first image output form from the second image output form, by differentiating output areas of the images in a single page. Thus, the image that has been determined to be the stereo image is output from the output unit in the first output form that outputs on a given output area in a single page. The image that has been determined to be the normal image is output from the output unit in the second output form that outputs on another output area in the single page. It is possible to distinguish the stereo image from the normal image from the output area in the single page.

In the image output control apparatus in the above-mentioned aspect, preferably, the first image output form has an arrangement of the stereo image in a first output area in the single page, the second image output form has an arrangement of the normal image in a second output area in the single page, and the arrangement of the stereo image in the first output area has a width equal to that of the arrangement of the normal image in the second output area. Thus, the image that has been determined to be the stereo image is output from the output unit in the first output form that has a given width. The image that has been determined to be the normal image is output from the output unit in the second output form that has the same with as that of the first output form. It is possible to arrange the stereo image and the normal image so as to make a good view.

In the image output control apparatus in the above-mentioned aspect, the output form control unit may control the image output form to distinguish the first image output form from the second image output form, by differentiating output pages of the images. Thus, the image that has been determined to be the stereo image is output from the output unit in the first output form that outputs on a page. The image that has been determined to be the normal image is output from the output unit in the second output form that outputs on another page. It is possible to distinguish the stereo image from the normal image from the output page.

In the image output control apparatus in the above-mentioned aspect, preferably, the image output control apparatus further includes an image separation unit that separates the stereo image into the left-eye image and the right-eye image, and any one of the left-eye image and the right-eye image is output from the output unit in the first image output form. Thus, the image that has been determined to be the stereo image is output from the output unit in the first output form that outputs any one of the right-eye or the left-eye images. The first output form is different from the second output form, and it is possible to distinguish the stereo image from the normal image.

In the image output control apparatus in the above-mentioned aspect, preferably, the image output control apparatus further includes a separation determining unit that determines whether the stereo image should be separated into the left-eye image and the right-eye image, and the image separation unit separates the stereo image into the left-eye image and the right-eye image, when the stereo image is determined to be separated into the left-eye image and the right-eye image. With the above-mentioned configuration, it is possible to choose any one of the left-eye and the right-eye images are output or a pair of the left-eye and the right-eye images are output, according to the separation determining criteria.

In another aspect of the present invention, an image output control method for outputting images from an output unit includes the steps of determining an image type that determines whether an image is a stereo image or a normal image, the stereo image being composed of a pair of a left-eye image and a right-eye image, and distinguishing a first image output form from a second image output form, the first image output form being used for outputting the image that the image type determining unit has determined to be the stereo image, and the second image output form being used for outputting the image that the image type determining unit has determined to be the normal image.

In another aspect of the present invention, a storage medium readable by a computer to execute a process of outputting images from an output unit on a computer, the function of the storage medium includes the steps of determining whether a type of an image is a stereo image or a normal image, the stereo image being composed of a pair of a left-eye image and a right-eye image, and controlling an image output form to distinguish a first image output form from a second image output form, the first image output form being used for outputting the image that has been determined as the stereo image, and the second image output form being used for outputting the image that has been determined as the normal image.

In another aspect of the present invention, a printer device includes a printing unit, and an image output control apparatus that outputs images from the printing unit, and the image output control apparatus for outputting images from an output unit includes an image type determining unit that determines whether an image to be output is a stereo image or a normal image, the stereo image being composed of a pair of a left-eye image and a right-eye image, and an output form control unit that controls an image output form to distinguish a first image output form from a second image output form, the first image output form being used for outputting the image determined to be the stereo image, and the second image output form being used for outputting the image determined to be the normal image.

Although a few preferred embodiments of the present invention have been shown and described, it would be appreciated by those skilled in the art that changes may be made in these embodiments without departing from the principles and spirit of the invention, the scope of which is defined in the claims and their equivalents.

The entire disclosure of Japanese Patent Application No. 2004-130409 filed on Apr. 26, 2004 including specification, claims, drawings, and abstract is incorporated herein by reference in its entirety.

What is claimed is:

1. An image output control apparatus for outputting images comprising:
    an image type determining unit that determines whether an image to be output is a stereo image or a normal image, the stereo image being composed of a pair of a left-eye image and a right-eye image, and the normal image being composed of a single, two-dimensional image; and
    an output form controller that controls an image output form selected at least from a first image output form and a second image output form, the first image output form being used for outputting the stereo image, and the second image output form being used for outputting the normal image, according to the determination of the image type determining unit,
    wherein the output form controller controls the image output form to distinguish the first image output form from the second image output form, by adding different additional images to the stereo image and the normal image.

2. The image output control apparatus as claimed in claim 1, wherein the different additional images include frame images.

3. An image output control apparatus for outputting images comprising:

an image type determining unit that determines whether an image to be output is a stereo image or a normal image, the stereo image being composed of a pair of a left-eye image and a right-eye image, and the normal image being composed of a single, two-dimensional image; and an output form controller that controls an image output form selected at least from a first image output form and a second image output form, the first image output form being used for outputting the stereo image, and the second image output form being used for outputting the normal image, according to the determination of the image type determining unit, wherein the output form controller controls the image output form to distinguish the first image output form from the second image output form, by adding different frame images to the stereo image and the normal image.

4. An image output control apparatus for outputting images comprising:

an image type determining unit that determines whether an image to be output is a stereo image or a normal image, the stereo image being composed of a pair of a left-eye image and a right-eye image, and the normal image being composed of a single, two-dimensional image; and an output form controller that controls an image output form selected at least from a first image output form and a second image output form, the first image output form being used for outputting the stereo image, and the second image output form being used for outputting the normal image, according to the determination of the image type determining unit, wherein the output form controller distinguishes the first image output form from the second image output form, based on a size of the images to be output.

5. The image output control apparatus as claimed in claim 4, wherein the output form controller controls the image output form to distinguish the first image output form from the second image output form, by enlarging the size of the stereo image to be larger than the normal image.

6. An image output control apparatus for outputting images comprising:

an image type determining unit that determines whether an image to be output is a stereo image or a normal image, the stereo image being composed of a pair of a left-eye image and a right-eye image, and the normal image being composed of a single, two-dimensional image; and an output form controller that controls an image output form selected at least from a first image output form and a second image output form, the first image output form being used for outputting the stereo image, and the second image output form being used for outputting the normal image, according to the determination of the image type determining unit, wherein the output form controller controls the image output form to distinguish the first image output form from the second image output form, by differentiating output areas of the images in a single page.

7. An image output control apparatus for outputting images comprising:

an image type determining unit that determines whether an image to be output is a stereo image or a normal image, the stereo image being composed of a pair of a left-eye image and a right-eye image, and the normal image being composed of a single, two-dimensional image; and an output form controller that controls an image output form selected at least from a first image output form and a second image output form, the first image output form being used for outputting the stereo image, and the second image output form being used for outputting the normal image, according to the determination of the image type determining unit, wherein:

the first image output form has an arrangement of the stereo image in a first output area in the single page;

the second image output form has an arrangement of the normal image in a second output area in the single page; and the arrangement of the stereo image in the first output area has a width equal to that of the arrangement of the normal image in the second output area.

8. An image output control apparatus for outputting images comprising:

an image type determining unit that determines whether an image to be output is a stereo image or a normal image, the stereo image being composed of a pair of a left-eye image and a right-eye image, and the normal image being composed of a single, two-dimensional image; and an output form controller that controls an image output form selected at least from a first image output form and a second image output form, the first image output form being used for outputting the stereo image, and the second image output form being used for outputting the normal image, according to the determination of the image type determining unit, wherein the output form controller controls the image output form to distinguish the first image output form from the second image output form, by differentiating output pages of the images.

9. An image output control apparatus for outputting images comprising:

an image type determining unit that determines whether an image to be output is a stereo image or a normal image, the stereo image being composed of a pair of a left-eye image and a right-eye image, and the normal image being composed of a single, two-dimensional image;

an output form controller that controls an image output form selected at least from a first image output form and a second image output form, the first image output form being used for outputting the stereo image, and the second image output form being used for outputting the normal image, according to the determination of the image type determining unit and;

an image separation unit that separates the stereo image into the left-eye image and the right-eye image, wherein:

any one of the left-eye image and the right-eye image is output in the first image output form.

10. The image output control apparatus as claimed in claim 9, further comprising a separation determining unit that determines whether the stereo image should be separated into the left-eye image and the right-eye image, wherein:

the image separation unit separates the stereo image into the left-eye image and the right-eye image, when the stereo image is determined to be separated into the left-eye image and the right-eye image.

11. An image output control method for outputting images comprising:

determining an image type that determines whether an image is a stereo image or a normal image, the stereo image being composed of a pair of a left-eye image and a right-eye image, and the normal image being composed of a single, two-dimensional image;

selecting an image output form from a first image output form and a second image output form, the first image output form being used for outputting the stereo image, and the second image output form being used for outputting the normal image, according to the determination of the image type determining unit; and outputting images having the controlled image output form from a printing unit.

12. A storage medium readable by a computer to execute a process of outputting images from an output unit on a computer, the function of the storage medium comprising:

determining whether a type of an image is a stereo image or a normal image, the stereo image being composed of a pair of a left-eye image and a right-eye image, and the normal image being composed of a single, two-dimensional image;

controlling an image output form selected at least from a first image output form and a second image output form, the first image output form being used for outputting the stereo image, and the second image output form being used for outputting the normal image, according to the determination of the image type determining unit; and outputting images having the controlled image output form from a printing unit.

13. A printer device comprising:

a printing unit;

an image type determining unit that determines whether an image to be output is a stereo image or a normal image, the stereo image being composed of a pair of a left-eye image and a right-eye image, and the normal image being composed of a single, two-dimensional image;

an output form controller that controls an image output form selected at least from a first image output form and a second image output form, the first image output form being used for outputting the stereo image, and the second image output form being used for outputting the normal image, according to the determination of the image type determining unit; and an image output controller that outputs images having the image output form controlled by the output form controller from the printing unit.

* * * * *